United States Patent
O'Dea

(10) Patent No.: US 6,502,029 B2
(45) Date of Patent: Dec. 31, 2002

(54) SYSTEM AND METHOD FOR ABS STABILITY CONTROL

(75) Inventor: Kevin A. O'Dea, Ann Arbor, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/754,497

(22) Filed: Jan. 3, 2001

(65) Prior Publication Data

US 2002/0095252 A1 Jul. 18, 2002

(51) Int. Cl.[7] .......... G06F 15/50; G06F 17/00; G06F 7/00; B60T 8/58; B60T 8/64
(52) U.S. Cl. .......... 701/71; 701/73; 701/78; 701/72; 701/74; 701/70; 701/81; 701/82; 701/83; 701/90; 701/91; 701/75; 303/3; 303/11; 303/165; 303/162; 303/175; 303/20; 303/158; 303/147; 303/169; 303/157; 188/152; 188/156; 188/158; 188/159
(58) Field of Search .......... 701/1, 73, 78, 701/71, 72, 74, 75, 70, 81, 82, 83, 90, 91; 303/113.2, 165, 3, 175, 162, 115.2, 158, 147, 113.4, 116.1, 169, 157, 156, 11, 20; 188/152, 156, 158, 159

(56) References Cited

U.S. PATENT DOCUMENTS

| | | | | |
|---|---|---|---|---|
| 5,063,514 A | * | 11/1991 | Headley et al. | 303/147 |
| 5,273,349 A | * | 12/1993 | Kidston | 303/162 |
| 5,281,009 A | * | 1/1994 | Kidston et al. | 303/156 |
| 5,423,600 A | * | 6/1995 | Riddiford et al. | 188/156 |
| 5,454,630 A | * | 10/1995 | Zhang | 303/175 |
| 5,511,859 A | * | 4/1996 | Kade et al. | 188/156 |
| 5,669,679 A | * | 9/1997 | Hammoud et al. | 303/163 |
| 5,884,985 A | * | 3/1999 | Ganzel et al. | 303/113.2 |

* cited by examiner

Primary Examiner—William A. Cuchlinski, Jr.
Assistant Examiner—Ronnie Mancho
(74) Attorney, Agent, or Firm—Scott A. McBain

(57) ABSTRACT

A system and method for ABS stability control is provided, the method comprising the steps of determining whether a first wheel is in an ABS mode; determining whether the first wheel is in an apply mode; determining whether a second parallel wheel is in the release mode; calculating an adjusted wheel slip if the first wheel is in the ABS mode, the first wheel is in the apply mode, and the second parallel wheel is in the release mode; and determining a control mode for the first wheel using the adjusted wheel slip.

16 Claims, 3 Drawing Sheets

United States Patent US 6,502,029 B2

SYSTEM AND METHOD FOR ABS STABILITY CONTROL

TECHNICAL FIELD

This invention relates generally to the field of control of antilock braking for vehicles, and in particular, to a system and method for ABS stability control.

BACKGROUND OF THE INVENTION

Antilock braking systems (ABS) are becoming more common on vehicles, particularly automobiles and light trucks. When the driver applies the brakes, ABS monitors whether a tire is skidding or about to skid, and automatically releases the brakes for a short period, so the wheel is allowed to rotate, rather than skid. The ABS control system controls braking pressure in either an applied, hold, or release state, cycling from one to the other throughout the stop, depending on a wheel's skid condition.

Typically, skidding is monitored at each of a vehicle's four wheels by measuring wheel speed and looking for a sudden deceleration, indicating the wheel is no longer rolling, but is stopping and skidding. Braking pressure is typically controlled to both rear wheels as a single channel for stability, while braking pressure to each front wheel is controlled independently.

Although controlling the breaking pressure to the rear wheels as a single channel helps maintain vehicle stability, it has the disadvantage of reducing rear braking efficiency and increasing stopping distance because it ignores differences between the rear wheels. One rear wheel may have braking pressure applied or released because of the state of the other rear wheel, controlled on the same channel. One rear wheel may be more worn or be adjusted differently than the other. One rear wheel may be traveling further than the other in a turn. Thus, under single channel breaking control the ABS control state of one rear wheel may be inappropriate for the conditions sensed at that wheel.

Controlling the braking pressure to the front wheels independently greatly reduces the stopping distance, but may have the disadvantage of increasing vehicle yaw. One front wheel may be in the apply mode at the same time the other front wheel is in the release mode, producing a yaw moment on the vehicle. Under certain conditions for certain vehicles, the yaw may induce steering oscillations, making the vehicle more difficult to control and distracting the driver during a stressful situation. The effect may be most pronounced at high vehicle speeds on dry surfaces.

Accordingly, it would be desirable to have a system and method of ABS stability control that overcomes the disadvantages described.

SUMMARY OF THE INVENTION

One aspect of the invention provides a method for ABS stability control, comprising the steps of determining whether a first wheel is in an ABS mode; determining whether the first wheel is in an apply mode; determining whether a second parallel wheel is in the release mode; calculating an adjusted wheel slip if the first wheel is in the ABS mode, the first wheel is in the apply mode, and the second parallel wheel is in the release mode; and determining a control mode for the first wheel using the adjusted wheel slip.

Another aspect of the invention provides a method for ABS stability control using the rear wheels, comprising the steps of determining whether a first rear wheel is in an ABS mode; determining whether the first rear wheel is in an apply mode; determining whether a second rear wheel is in the release mode; calculating an adjusted wheel slip if the first rear wheel is in the ABS mode, the first rear wheel is in the apply mode, and the second rear wheel is in the release mode; and determining a control mode for the first rear wheel using the adjusted wheel slip. The step of calculating an adjusted wheel slip further comprises the steps of selecting a slip offset as the lesser of a first constant K1, or a second constant K2 times vehicle speed with the product added to a third constant K3; and adding the slip offset to the measured wheel slip from the first rear wheel to calculate the adjusted wheel slip.

Another aspect of the invention provides a method for ABS stability control using the front wheels, comprising the steps of determining whether a first front wheel is in an ABS mode; determining whether the first front wheel is in an apply mode; determining whether a second front wheel is in a release mode; determining whether a vehicle speed is greater than a speed constant K4; determining whether a vehicle acceleration is less than an acceleration constant K5; calculating an adjusted wheel slip by adding a slip constant K6 to a measured wheel slip for the first front wheel if the first front wheel is in the ABS mode, the first front wheel is in the apply mode, the second front wheel is in the release mode, the vehicle speed is greater than the speed constant K4, and the vehicle acceleration is less than the acceleration constant K5; and determining a control mode for the first front wheel using the adjusted wheel slip.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DESCRIPTION OF THE PREFERRED EMBODIMENT

Figure 2:
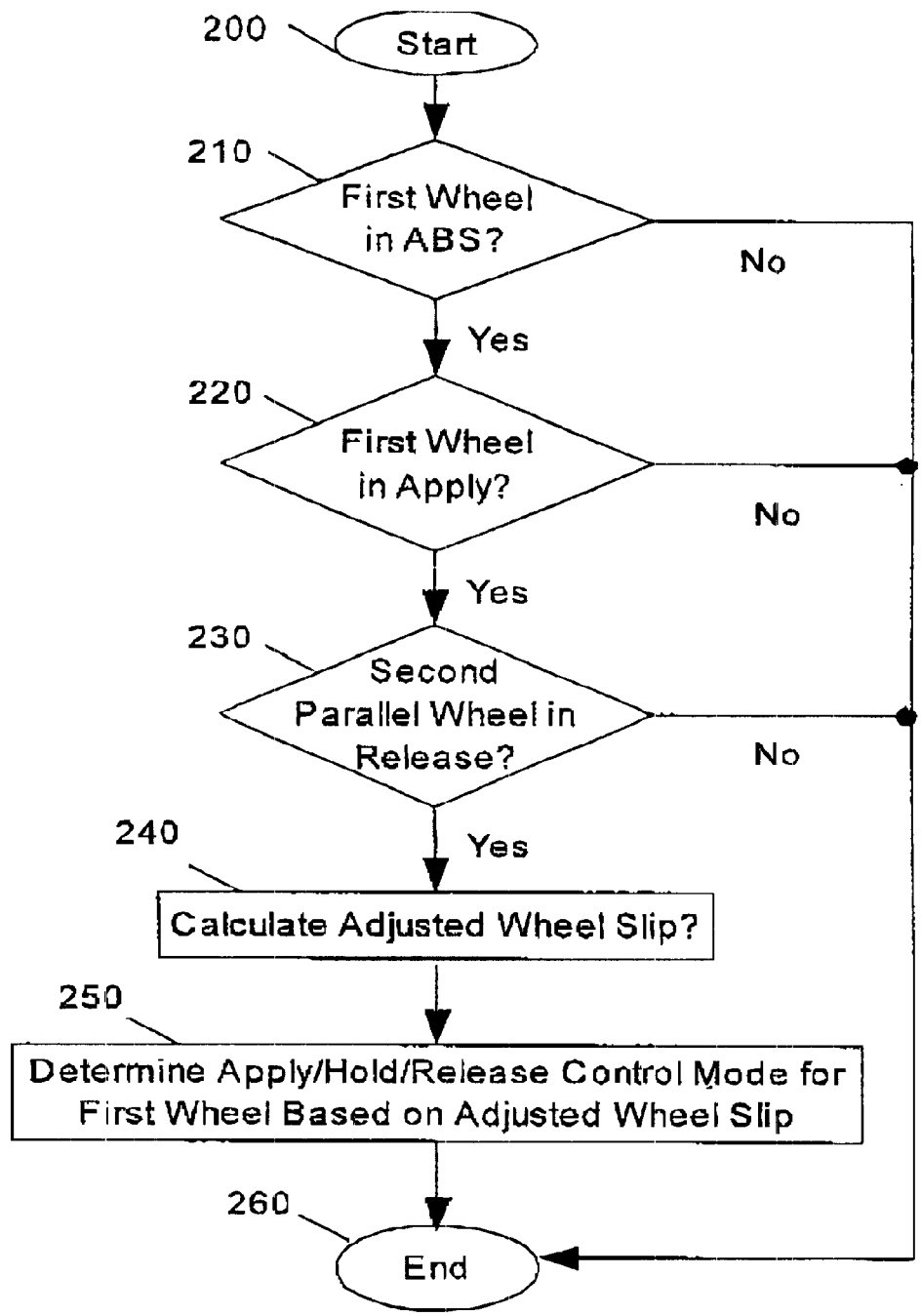
FIG. 2 is a flow chart of a preferred embodiment of a method of ABS stability control that is made in accordance with the invention.

FIG. 2 is a flow chart of a method of ABS stability control. Programmed circuits, such as microcomputers, microprocessors, etc., or discrete components, can be used to carry out the method. After the 'START' (represented by reference numeral 200) of the program section described, it is determined whether either of a predetermined wheel pair, i.e., front pair or back pair, is in the ABS mode (210). If not, the program section ends (260).

If either wheel is in the ABS mode, it is determined whether that first wheel is in the apply mode, i.e., whether the braking system is applying hydraulic pressure to the first wheel (220). If not, the program section ends (260). If the first wheel is in the apply mode, it is determined whether the second parallel wheel is in the release mode, i.e., whether the braking system has released hydraulic pressure from the second parallel wheel (330). If not, the program section ends (260).

If the second parallel wheel is in the release mode, an adjusted wheel slip is calculated (240) and used to determine the control mode for the first wheel (250). Once the control mode for the first wheel has been determined for the first rear wheel, the program section ends (260). Determining the control mode using the adjusted wheel slip on the first wheel and the measured wheel slip on the second parallel wheel reduces the yaw moment across the vehicle and increases stability.

Although the steps of the embodiment above are presented in the preferred order, the steps may be completed in different orders. The steps of determining whether a first wheel is in an ABS mode, determining whether the first wheel is in an apply mode, and determining whether a second parallel wheel is in the release mode may be carried out in any order prior to calculating an adjusted wheel slip.

Figure 1:
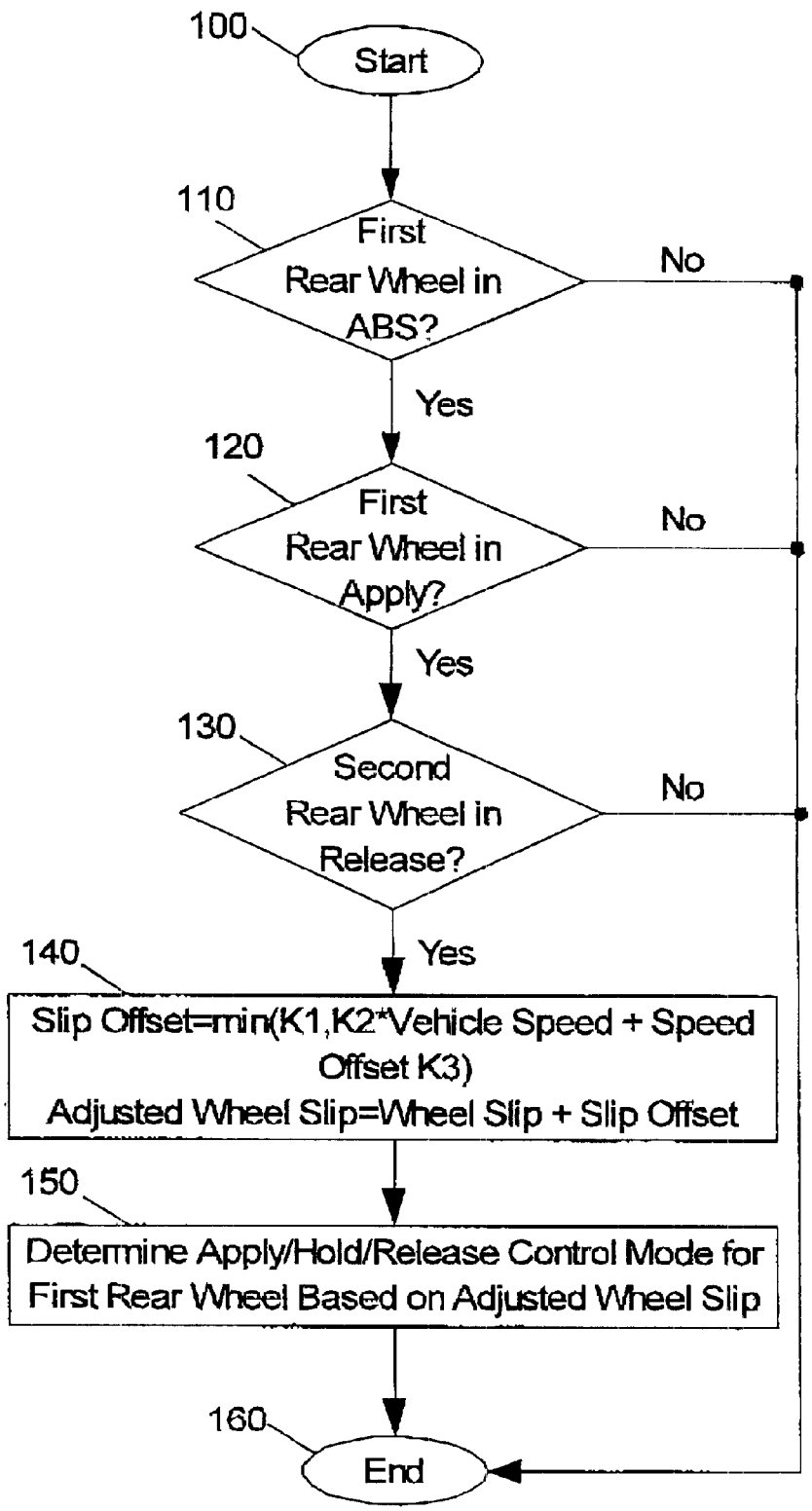
FIG. 1 is a flow chart of a preferred embodiment of a method of ABS stability control using the rear wheels that is made in accordance with the invention.

FIG. 1 is a flow chart of a method of ABS stability control using the rear wheels. Programmed circuits, such as microcomputers, microprocessors, etc., or discrete components, can be used to carry out the method. After the 'START' (represented by reference numeral 100) of the program section described, it is determined whether either of the rear wheels is in the ABS mode (110). If not, the program section ends (160).

If either rear wheel is in the ABS mode, it is determined whether that first rear wheel is in the apply mode, i.e., whether the braking system is applying hydraulic pressure to the first rear wheel (120). If not, the program section ends (160). If the first rear wheel is in the apply mode, it is determined whether the second rear wheel is in the release mode, i.e., whether the braking system has released hydraulic pressure from the second rear wheel (130). If not, the program section ends (160).

If the second rear wheel is in the release mode, an adjusted wheel slip is calculated (140) and used to determine the control mode for the first rear wheel (150). Because the adjusted wheel slip is larger than the measured wheel slip, the first rear wheel will enter the release mode earlier than if the measured wheel slip were used to determine its control mode. This avoids excessive yaw moment on the vehicle that could occur if the first rear wheel remained in the apply mode while the second rear wheel is in the release mode. This semi-independent pressure control ensures stability.

The adjusted wheel slip is the sum of measured wheel slip and a slip offset. The slip offset is selected from the lesser of a first constant K1, or a second constant K2 times vehicle speed with the product added to a third constant K3. Once the control mode for the first rear wheel has been determined for the first rear wheel, the program section ends (160).

The first constant K1, second constant K2, and third constant K3 are based on vehicle parameters and will vary from vehicle to vehicle. The constants may be determined by experiment. The value of first constant K1 is normally in the range 0 to 15% and typically about 10%. The value of second constant K2 is normally in the range 0 to 0.1%/kph and typically about 0.025%/kph. The value of third constant K3 is normally in the range 2 to 10% and typically about 3%.

Although the steps of the embodiment above are presented in the preferred order, the steps may be completed in different orders. The steps of determining whether a first rear wheel is in an ABS mode, determining whether the first rear wheel is in an apply mode, and determining whether a second rear wheel is in the release mode may be carried out in any order prior to calculating an adjusted wheel slip.

Figure 3:
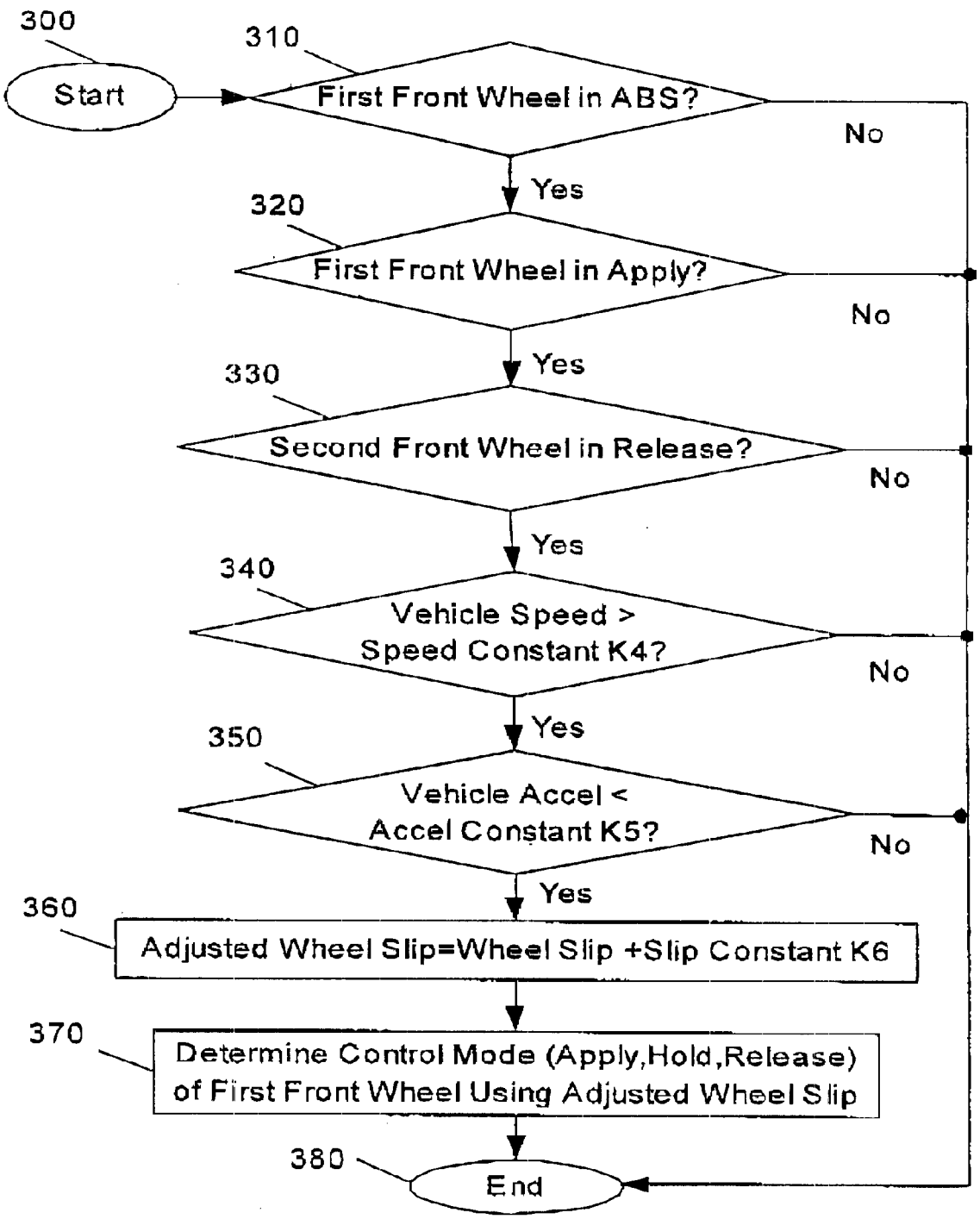
FIG. 3 is a flow chart of a preferred embodiment of a method of ABS stability control using the front wheels that is made in accordance with the invention.

FIG. 3 is a flow chart of a method of ABS stability control using the front wheels. Programmed circuits, such as microcomputers, microprocessors, etc., or discrete components, can be used to carry out the method. After the 'START' (represented by reference numeral 300) of the program section described, it is determined whether either of the front wheels is in the ABS mode (310). If not, the program section ends (380).

If either wheel is in the ABS mode, it is determined whether that first front wheel is in the apply mode, i.e., whether the braking system is applying hydraulic pressure to the first front wheel (320). If not, the program section ends (380). If the first front wheel is in the apply mode, it is determined whether the second front wheel is in the release mode, i.e., whether the braking system has released hydraulic pressure from the second front wheel (330). If not, the program section ends (380).

If the second front wheel is in the release mode, it is determined whether vehicle speed is greater than a speed constant K4 (340). If not, the program section ends (380). Yaw moments are not as critical at low speed, so the method is only applied above the speed determined by the speed constant K4.

If the vehicle speed is greater than a speed constant K4, it is determined whether vehicle acceleration is less than an acceleration constant K5 (350). If not, the program section ends (380). Yaw moments are not as critical on surfaces with a low friction coefficient, so the method is only applied when the surface has a high friction coefficient producing rapid vehicle deceleration.

If the vehicle acceleration is less than the acceleration constant K5, an adjusted wheel slip is calculated (360) and used to determine the control mode for the first front wheel (370). The adjusted wheel slip is the sum of measured wheel slip and a slip constant K6. Because the adjusted wheel slip is larger than the measured wheel slip, the first front wheel will enter the release mode earlier than if the measured wheel slip were used to determine its control mode, maintaining equal torque at the front wheels. This avoids excessive yaw moment on the vehicle that could occur if the first front wheel remained in the apply mode while the second front wheel is in the release mode, and improves straight-line stability. Once the control mode for the first front wheel has been determined for the first front wheel, the program section ends (380).

The speed constant K4, acceleration constant K5, and slip constant K6 are based on vehicle parameters and will vary from vehicle to vehicle. The constants may be determined by experiment. Typical values are 100 kph for speed constant K4 and 0.7 g for acceleration constant K5. The size of the slip constant K6 determines how closely the front wheel action is coupled and is critical in determining stopping distance and vehicle stability. If the slip constant K6's value is high, the front wheels will act together all the time and the vehicle will be stable, but the stopping distance will be long. If the slip constant K6's value is low, the wheels will act more independently and the stopping distance will be short, but the stability improvement will be less. Slip constant K6 is in the range of 2 to 8% with typical values of 3 to 4%.

Although the steps of the embodiment above are presented in the preferred order, the steps may be completed in different orders. The steps of determining whether the first front wheel is in an apply mode; determining whether a second front wheel is in the release mode; determining whether a vehicle speed is greater than a speed constant K4; and determining whether a vehicle acceleration is less than an acceleration constant K5 may be carried out in any order prior to calculating an adjusted wheel slip.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for ABS stability control, comprising the steps of:
   determining whether a first wheel is in an ABS mode, the first wheel being a first rear wheel;
   determining whether the first wheel is in an apply mode;
   determining whether a second parallel wheel is in the release mode, the second parallel wheel being a second rear wheel;
   calculating an adjusted wheel slip if the first wheel is in the ABS mode, the first wheel is in the apply mode, and the second parallel wheel is in the release mode; and
   determining a control mode for the first wheel using the adjusted wheel slip;
   wherein the step of calculating an adjusted wheel slip further comprises:
      selecting a slip offset as the lesser of a first constant K1, or a second constant K2 times vehicle speed with the product added to a third constant K3; and
      adding the slip offset to the measured wheel slip from the first rear wheel to calculate the adjusted wheel slip.

2. The method of claim 1 wherein the first constant K1 is in the range of 0 to 15%.

3. The method of claim 1 wherein the first constant K1 is in the range of 9 to 11%.

4. The method of claim 1 wherein the second constant K2 in the range of 0 to 0.1%/kph.

5. The method of claim 1 wherein the second constant K2 in the range of 0.02 to 0.03%/kph.

6. The method of claim 1 wherein the third constant K3 is in the range of 2 to 10%.

7. The method of claim 1 wherein the third constant K3 is in the range of 2 to 4%.

8. A method for ABS stability control, comprising the steps of:
   determining whether a first wheel is in an ABS mode, the first wheel being a first front wheel;
   determining whether the first wheel is in an apply mode;
   determining whether a second parallel wheel is in the release mode, the second parallel wheel being a second front wheel;
   determining whether a vehicle speed is greater than a speed constant K4;
   determining whether a vehicle acceleration is less than an acceleration constant K5;
   calculating an adjusted wheel slip by adding a slip constant K6 to a measured wheel slip for the first front wheel if the first wheel is in the ABS mode, the first wheel is in the apply mode, the second parallel wheel is in the release mode, the vehicle speed is greater than the speed constant K4, and the vehicle acceleration is less than the acceleration constant KS; and
   determining a control mode for the first wheel using the adjusted wheel slip.

9. The method of claim 8 wherein the speed constant K4 is at least 50 kph.

10. The method of claim 8 wherein the speed constant K4 is at least 95 kph.

11. The method of claim 8 wherein the acceleration constant K5 is less than 1.5 g.

12. The method of claim 8 wherein the acceleration constant K5 is less than 0.8 g.

13. The method of claim 8 wherein the slip constant K6 is in the range of 2 to 8%.

14. The method of claim 8 wherein the slip constant K6 is in the range of 3 to 4%.

15. A system for ABS stability control, comprising a computer program embodied on a computer-readable medium for:
   determining whether a first rear wheel is in an ABS mode;
   determining whether the first rear wheel is in an apply mode;
   determining whether a second rear wheel is in the release mode;
   calculating an adjusted wheel slip if the first rear wheel is in the ABS mode, the first rear wheel is in the apply mode, and the second rear wheel is in the release mode; and
   determining a control mode for the first rear wheel using the adjusted wheel slip;
   wherein the computer program further comprises selecting a slip offset as the lesser of a first constant K1, or a second constant K2 times vehicle speed with the product added to a third constant K3; and
   adding the slip offset to the measured wheel slip from the first rear wheel to calculate the adjusted wheel slip.

16. A system for ABS stability control, comprising:
   means for determining whether a first rear wheel is in an ABS mode;
   means for determining whether the first rear wheel is in an apply mode;
   means for determining whether a second rear wheel is in the release mode;
   means for calculating an adjusted wheel slip if the second rear wheel is in the release mode, if the first rear wheel is in the ABS mode, the first rear wheel is in the apply mode, and the second rear wheel is in the release mode; and
   means for determining a control mode for the first rear wheel using the adjusted wheel slip;
   wherein the means for calculating an adjusted wheel slip further comprises:
      means for selecting a slip offset as the lesser of a first constant K1, or a second constant K2 times vehicle speed with the product added to a third constant K3; and
      means for adding the slip offset to the measured wheel slip from the first rear wheel to calculate the adjusted wheel slip.

* * * * *